United States Patent [19]

Ostrander

[11] Patent Number: 5,083,297
[45] Date of Patent: Jan. 21, 1992

[54] METHOD OF IMPROVING THE SEISMIC RESOLUTION OF GEOLOGIC STRUCTURES

[75] Inventor: William J. Ostrander, Benicia, Calif.
[73] Assignee: Chevron Research and Technology Company, San Francisco, Calif.
[21] Appl. No.: 543,996
[22] Filed: Jun. 26, 1990
[51] Int. Cl.$^5$ ............................ G01V 1/28; G01V 1/30
[52] U.S. Cl. ........................................ 367/36; 367/59; 364/421
[58] Field of Search .................... 367/36, 59; 364/806, 364/924.5, 421, 223.9

[56] References Cited

U.S. PATENT DOCUMENTS

| | | | |
|---|---|---|---|
| 3,629,798 | 12/1971 | Rockwell | 367/59 |
| 4,232,378 | 11/1980 | Adams et al. | 367/36 |
| 4,242,740 | 12/1980 | Ruehle | 367/36 |
| 4,373,197 | 2/1983 | Gassaway et al. | 367/36 |
| 4,393,488 | 7/1983 | Gassaway et al. | 367/36 |
| 4,476,551 | 10/1984 | Ruehle | 367/59 |
| 4,581,724 | 4/1986 | Zachariadis | 367/36 |
| 4,802,146 | 1/1989 | Moeckel | 367/52 |

FOREIGN PATENT DOCUMENTS 864215 9/1981 U.S.S.R. .

OTHER PUBLICATIONS

Y. Henai, "Stacking and Migration Technique for Seismic Refraction", *Geophysical Prospecting For Petroleum*, vol. 25, No. 4, Dec., 1986.
"Method for Studying Refracting Boundaries in Geologic Layers", RD 03345, Western Siberia Geophysics, U.S.S.R. Ministry of Geology.
Y. Henai, "Multiple Stacking of Refraction at the Common Ejection Point-A Technique for Velocity Calculation and Common Ejection Point Depth Plotting", *Geophysical Prospecting For Petroleum*, vol. 27, No. 1, Mar., 1988, pp. 24-47.
Klemperer et al., "A Comparison of Reflection . . . Maine", Bull. Seismal. for Amer., vol. 77, #2, pp. 614-630, 4/8, abst. only supplied.
Yang, H; "Multiple Stocking . . . Depth Plotting", Geophys. Prospecting Petrol., vol. 27, #1, pp. 24-47, 3/88, abst. only supplied.
Igarashi et al., "The Effectiveness of Stacking Refraction . . . ", 55th Annu. Seg. Int. Ortg., Oct. 16, 1985, Pag. No. BNG 34.
Hawman et al.; "Processing and Immersion of Refraction . . . ", J. Geophys. Res., vol. 95, No. B4, pp. 4657-4691, Apr. 16, 1990; Abst. only.

*Primary Examiner*—Nelson Moskowitz
*Attorney, Agent, or Firm*—Edward J. Keeling; Matt W. Carson

[57] ABSTRACT

A method for improving the seismic resolution of geologic structures is disclosed. Refracted wave arrivals are gathered into common midpoint trace gathers. Data representations originating inside a critical offset distance are muted, and the remaining data is tau-P summed and projected into zero source-to-receiver offset. Constant velocity stacks can then be displayed. A plurality of common midpoint trace gathers can be used to generate multiple panels of tau-P sums. Portions of several of these panels can be combined to provide a complete image of the subsurface reactors. A near-surface velocity model can then be designed, to provide a solution to near-surface statics in seismic traces.

12 Claims, 11 Drawing Sheets

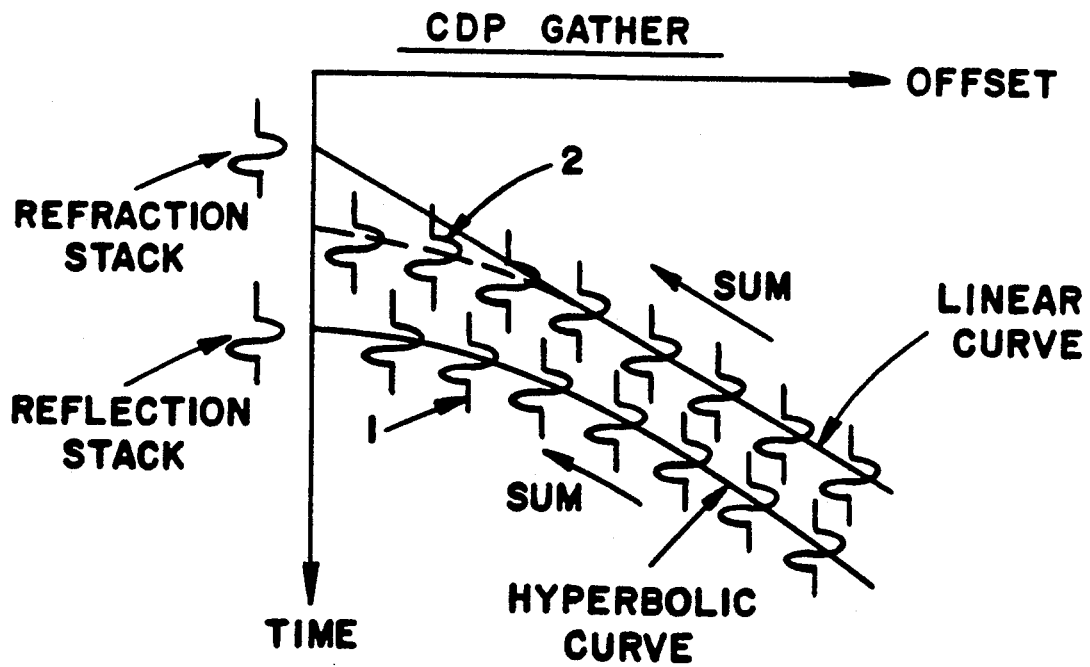
FIG_1
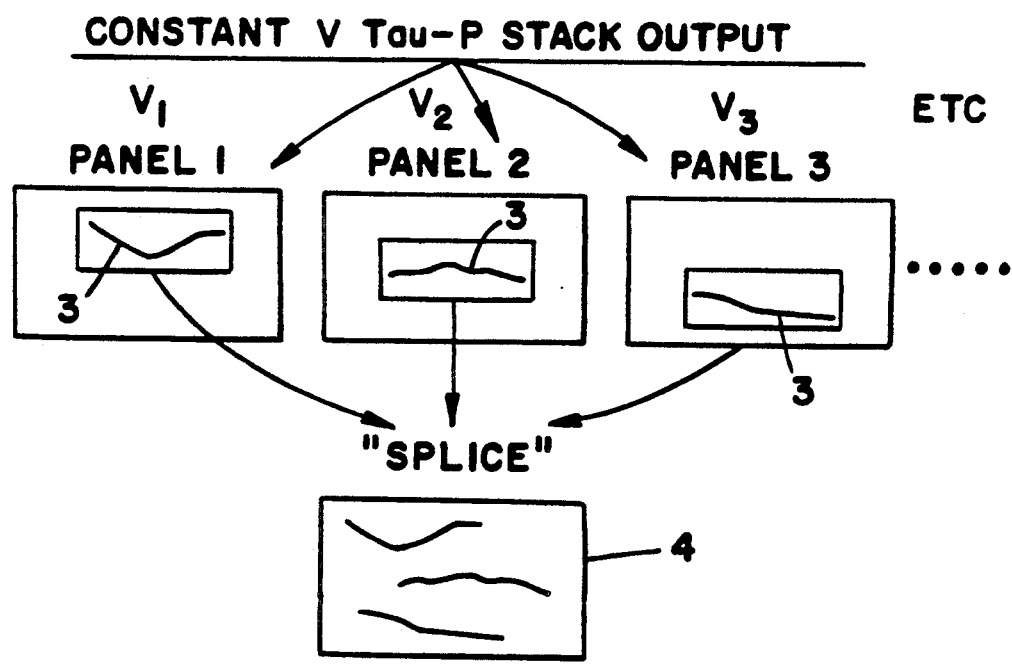
CUT AND SPLICE METHOD
FIG_2

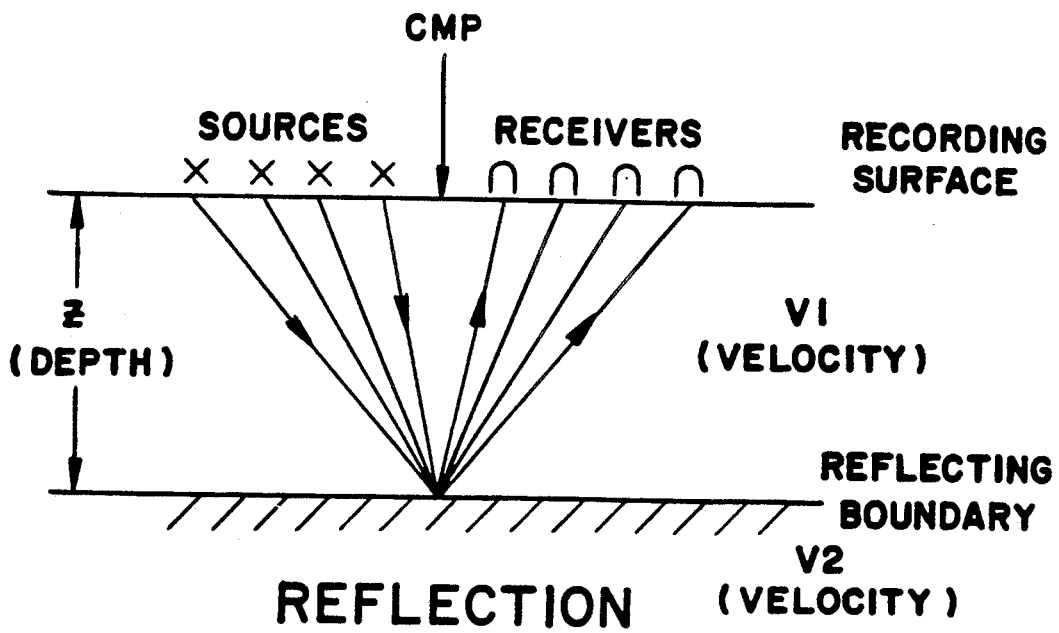
REFLECTION
FIG_3
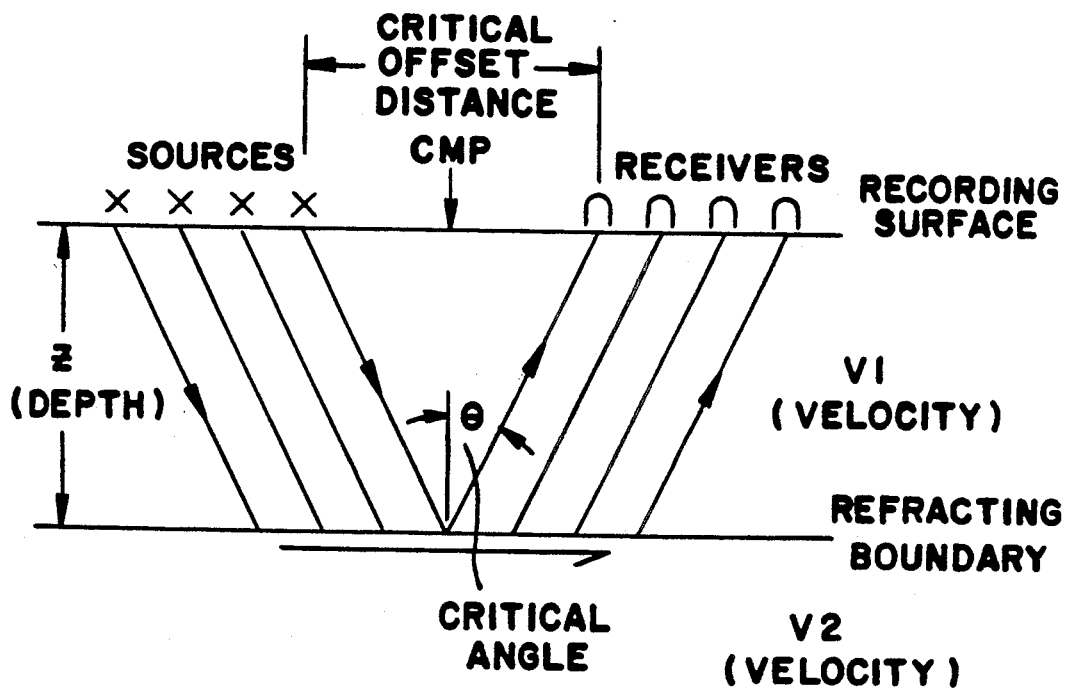
REFRACTION
FIG_3A

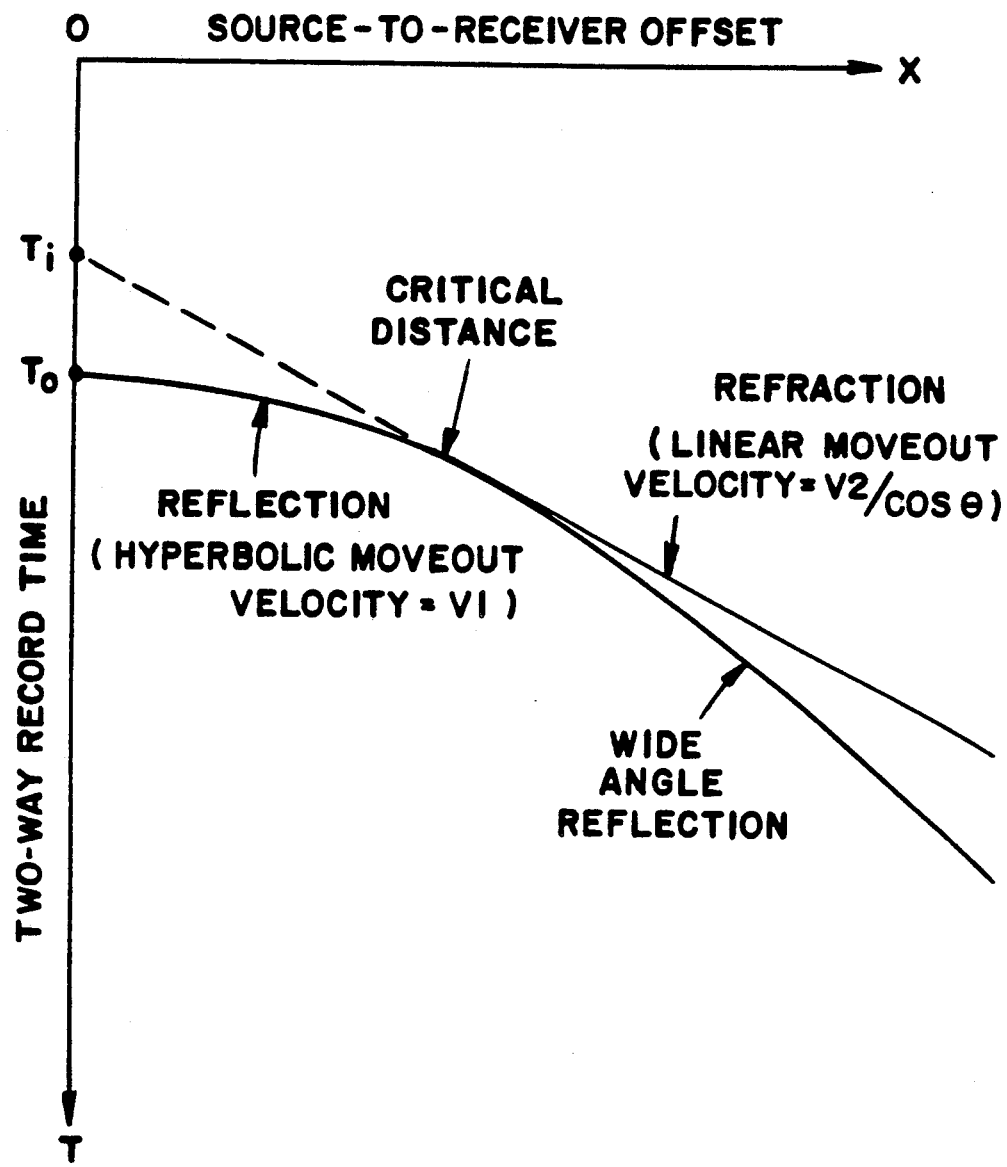
TRAVEL TIME CURVES FOR A
HORIZONTAL REFLECTOR/REFRACTOR
FIG_4

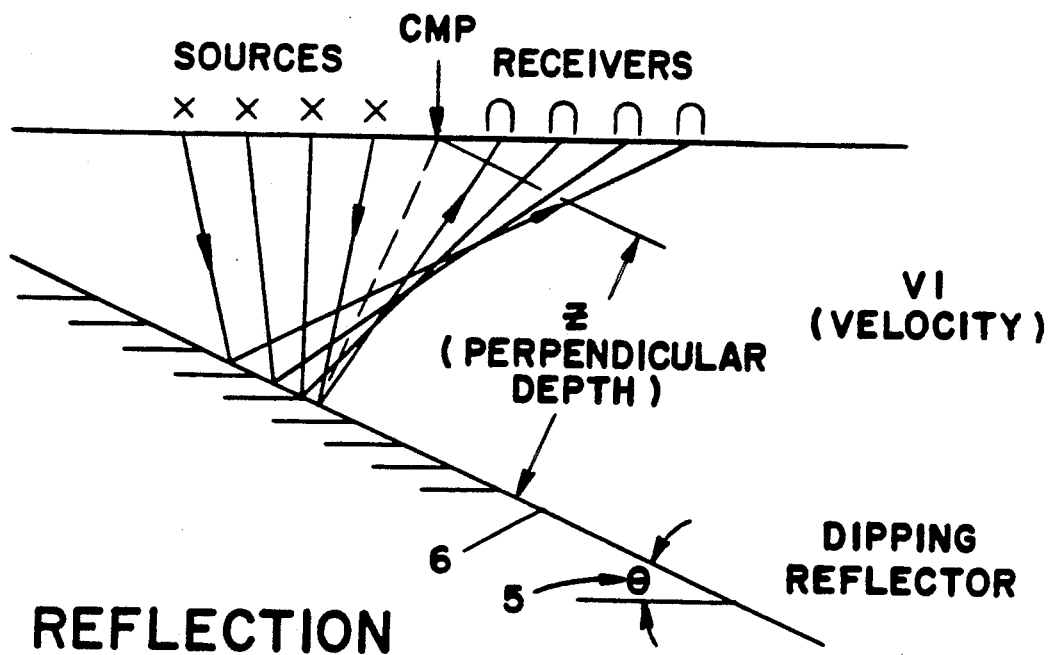
REFLECTION
FIG_5
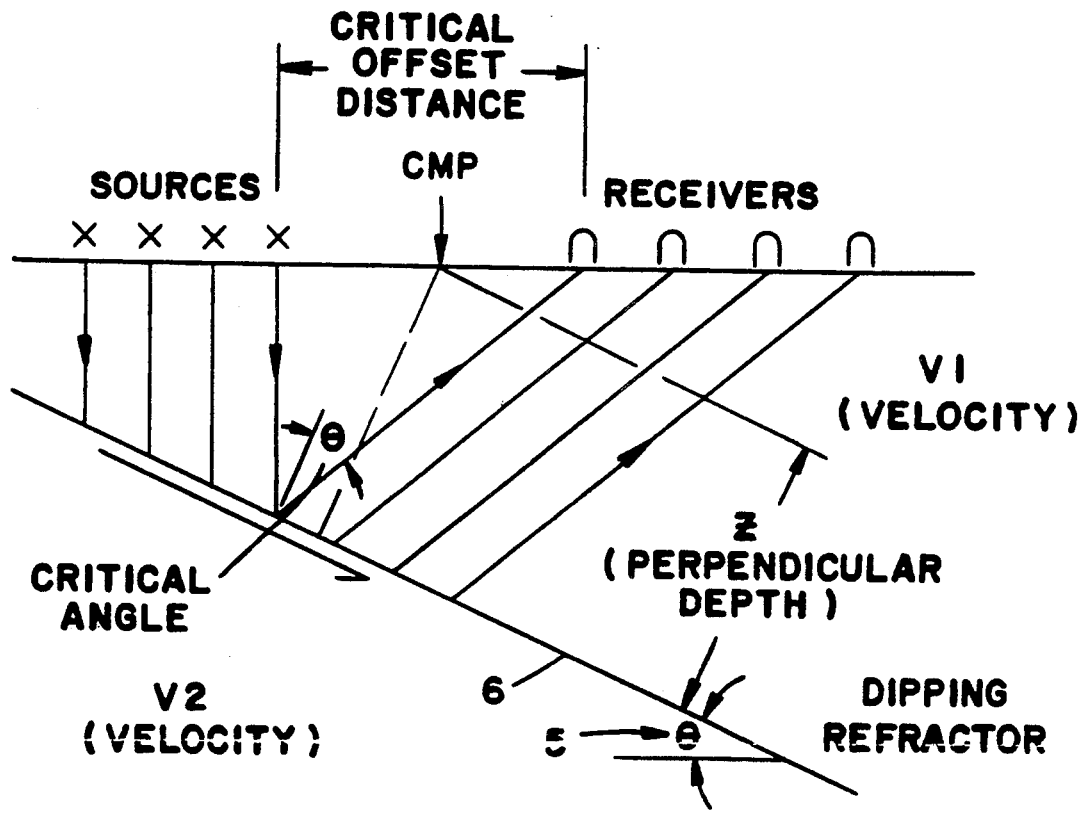
REFRACTION
FIG_5A

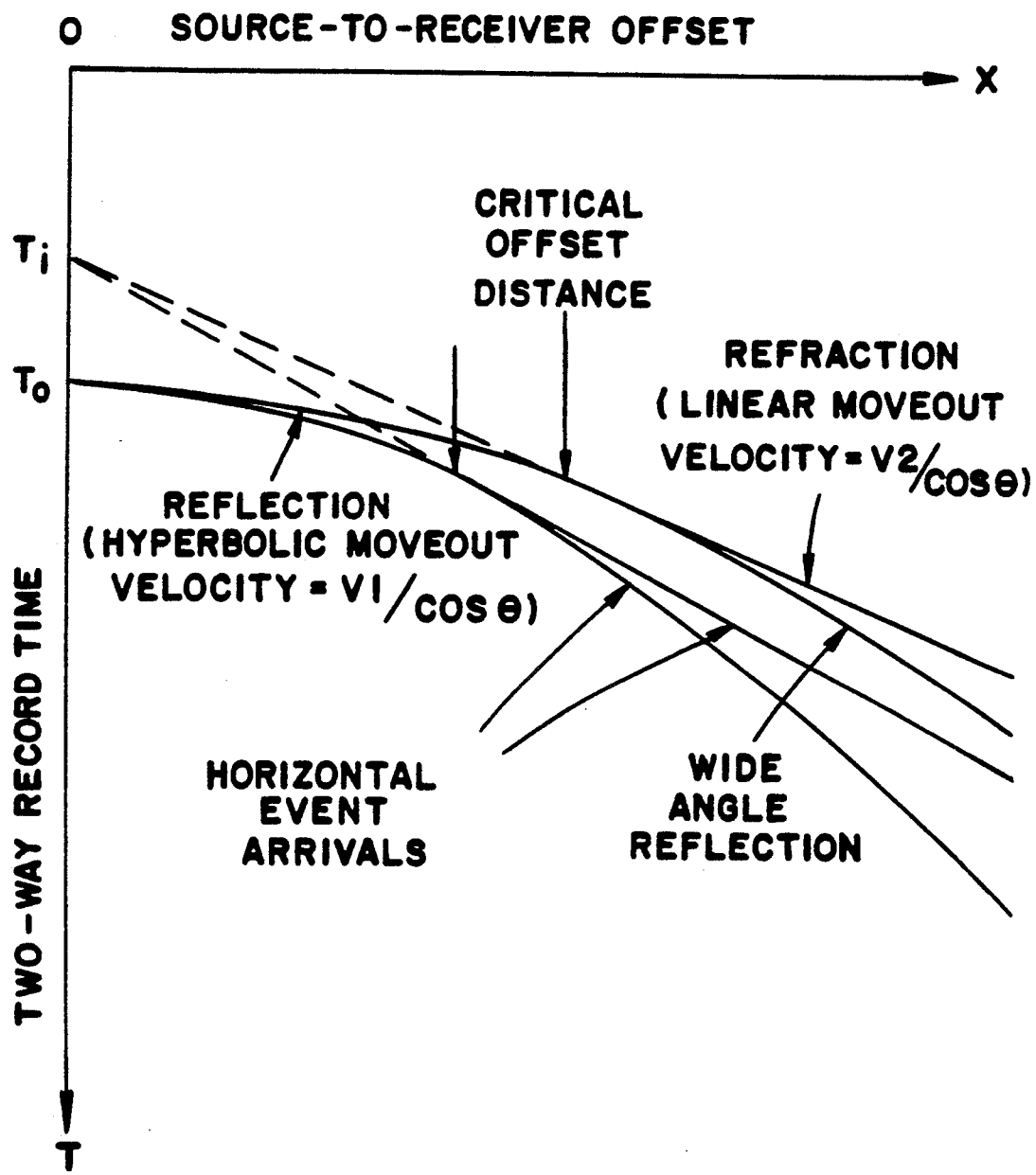
TRAVEL TIME CURVES FOR A
DIPPING REFLECTOR/REFRACTOR
FIG_6

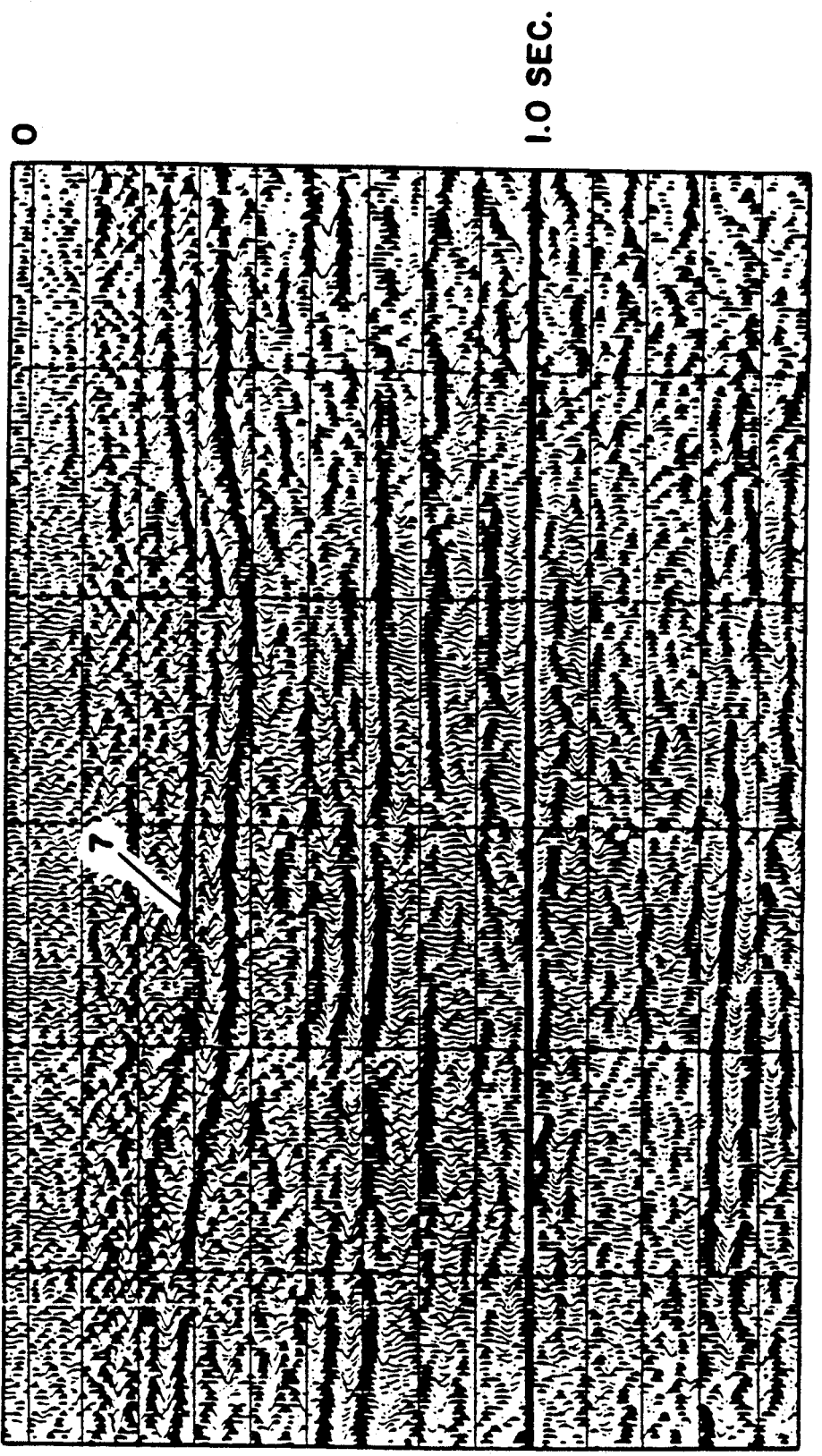
FIG_7 NORMAL STACK LINE 102

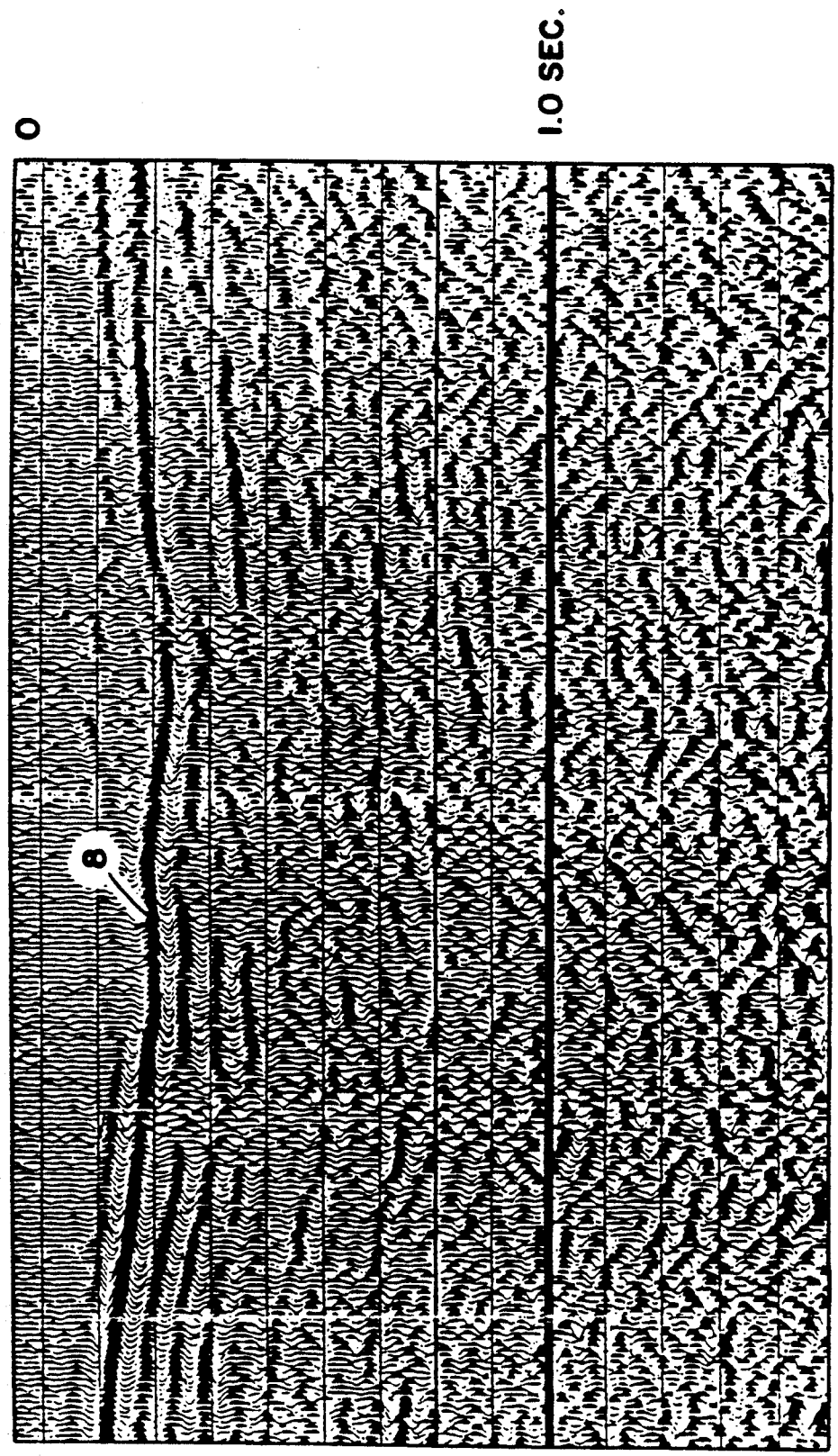
FIG_8

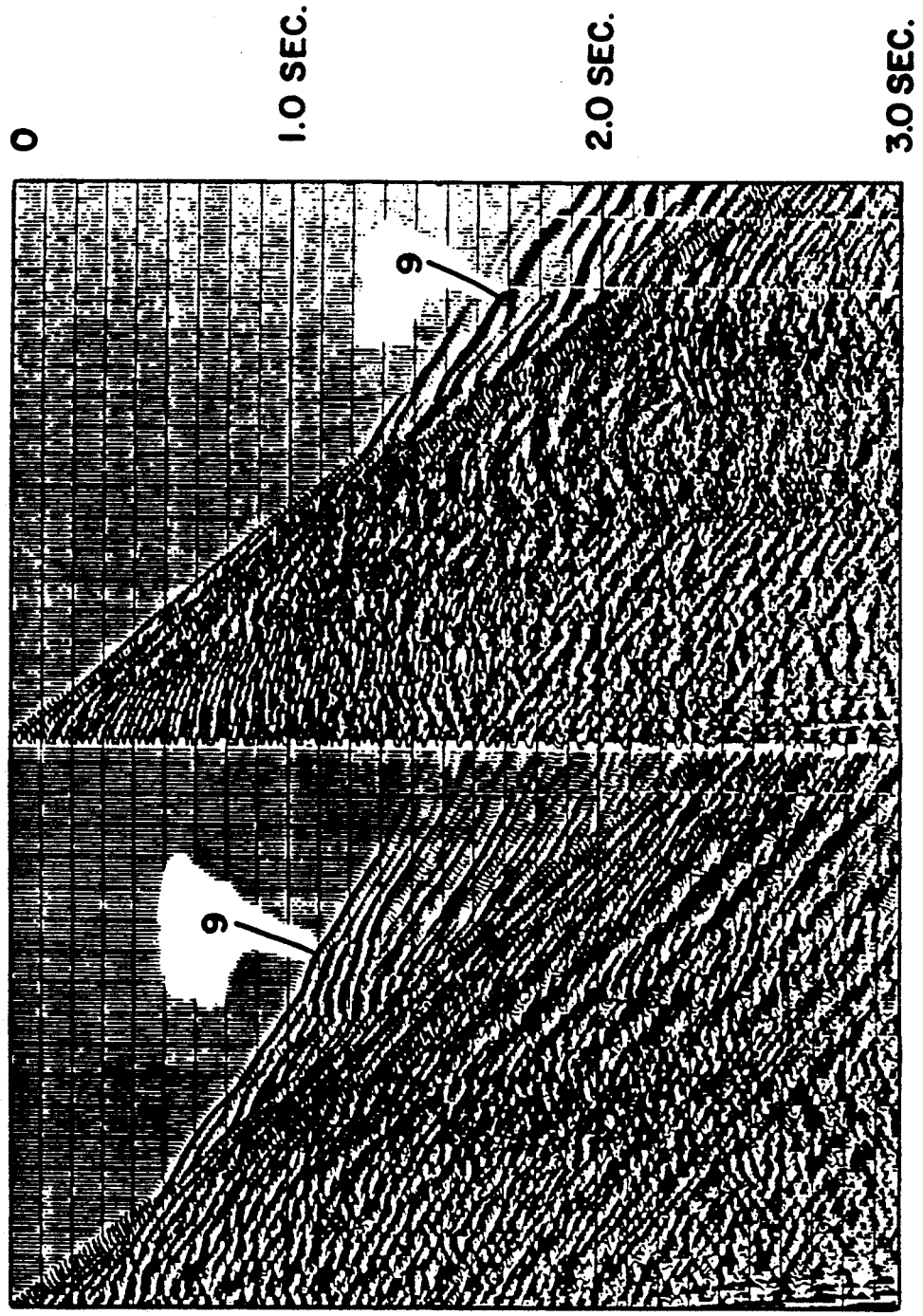
SHOT GATHERS LINE 2000
FIG_9

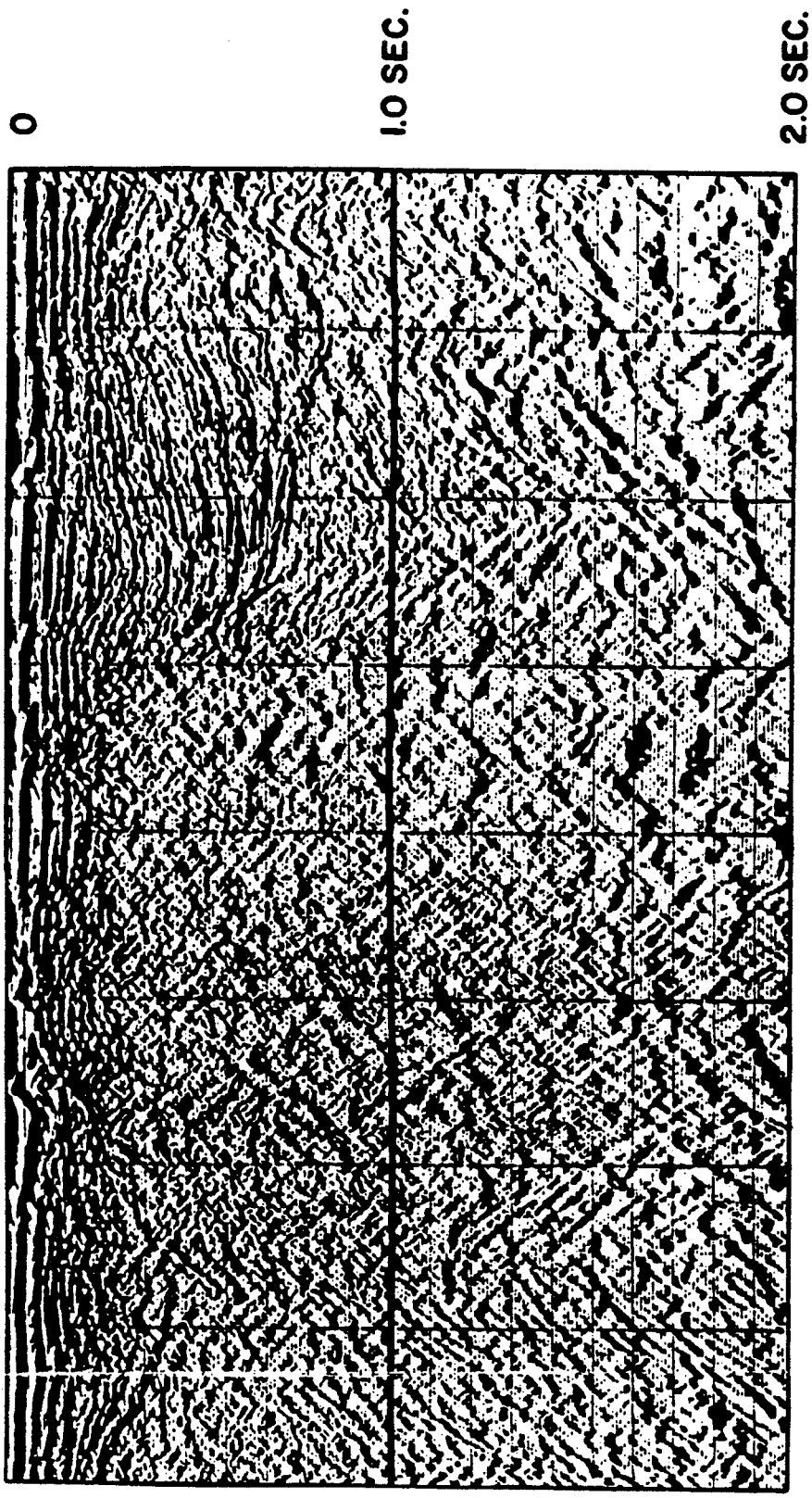
FIG_10 NORMAL CMP REFLECTION STACK LINE 2000

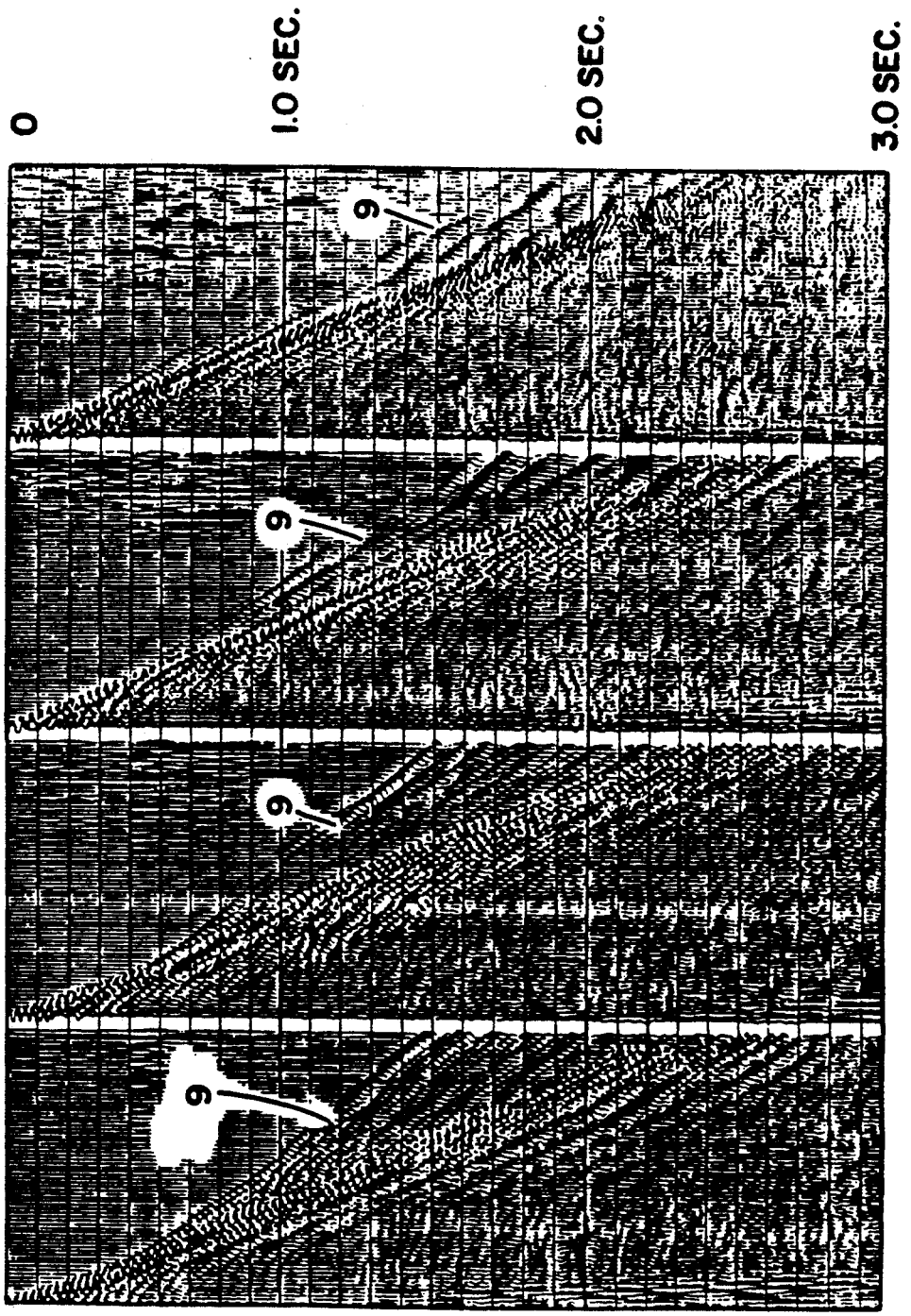

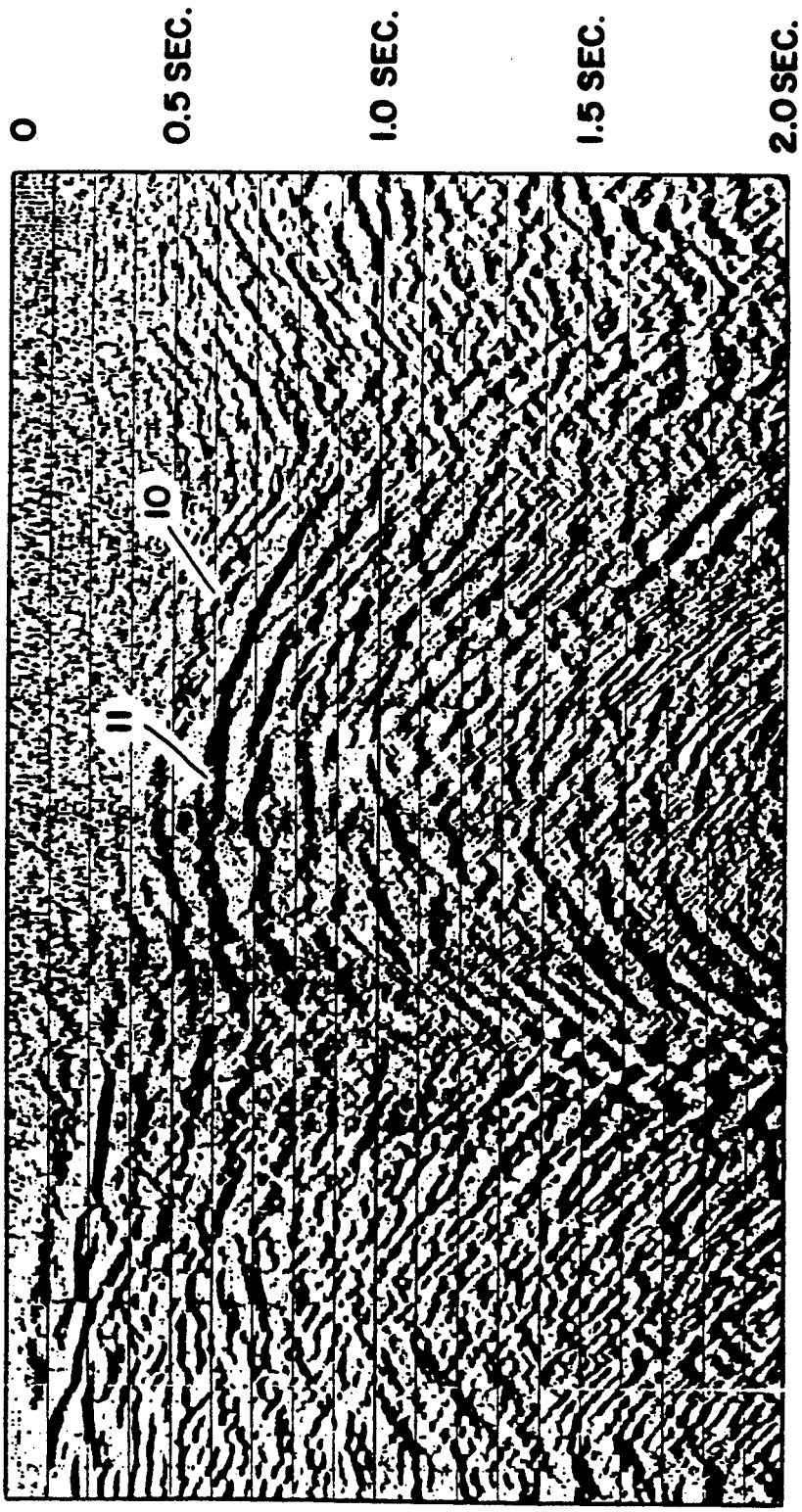
FIG_12

METHOD OF IMPROVING THE SEISMIC RESOLUTION OF GEOLOGIC STRUCTURES

FIELD OF INVENTION

The present invention relates generally to geophysical exploration for oil and gas. More specifically, this invention provides a method for reliably and accurately determining the subsurface location of selected geologic formations using seismic refraction data.

BACKGROUND OF THE INVENTION

In general, there are two types of seismic exploration methods in which seismic energy is injected into the earth at a first surface location and upon traveling through the subsurface formations is detected at a second surface location. In one such method, the reflection method, seismic energy is directly reflected by the boundaries between the subsurface formations and returns to the earth's surface. In the other of such methods, the refraction method, the seismic energy meets such boundaries between subsurface formations at such an angle that it is refracted along a path that passes through the lower of two formations substantially parallel to the boundary between the formations. Upon emerging from the lower formation into the upper formation, the seismic energy is again refracted at the boundary with a similar angle to that at which it originally entered the lower formation from the upper formation. Upon returning to the surface, the seismic energy is recorded as seismic refraction signals.

Refraction seismometry is of course nowhere near as popular as reflection seismometry. The only modern book which considers refraction prospecting in considerable depth is the volume "Seismic Refraction Prospecting," published in 1967 by the Society of Exploration Geophysicists under the editing of A. W. Musgrave.

In refraction seismic exploration, a number of seismic detectors are usually, but not necessarily, spaced at greater distances from one another than in reflection shooting, with the refraction detector array being spaced at great distances from the source of seismic disturbances, in practice as much as 5 to 15 miles. Thus, refraction seismic exploration enables large areas to be quickly surveyed, and also enables mapping of certain remote areas in which reflection shooting would be extremely difficult or costly. Further, in refraction exploration, refracted signals having relatively low-frequency spectrums, and therefor low attenuation, are of interest as compared to the higher frequency spectrums often of primary interest in reflection shooting. The use of refraction shooting is also desirable in mapping massive geologic members such as limestone layers or the like, as the velocity information provided by such refraction techniques assists in correlating and identifying desired events or key horizons.

Improved techniques have been developed for obtaining and interpreting refraction data, a number of which are described in Seismic Refraction Prospecting, published by The Society of Exploration Geophysicists in 1967. However, in spite of the many advantages which attach to refraction seismic exploration, the use of reflection techniques is currently more common. It is believed that one reason for this situation is that suitable techniques have not been heretofore developed for suppressing unwanted events and enhancing desired events in seismic refraction work.

In oil and gas exploration, seismic reflection shooting has been well known and practiced for decades. Since the mid 60's, common-depth-point (CDP) recording of seismic reflection data has been the major surface exploration technique for oil and gas reserves. After its introduction (Mayne, 1962) it took only a few years for geophysicists to realize the fundamental properties of CDP stacking. Mayne's original concept was that of large receiver arrays simulated by CDP stacking without reflection point smearing. This concept has proven itself time and time again as the best reflection seismic data enhancement technique available. Today, the term common-mid-point (CMP) stacking is commonly used rather than CDP since it better describes the geometry of the method. CMP seismic traces are all those traces which have the same geometrical mid-point half way between their corresponding source location and receiver location.

Seismic data is typically collected with one source or source array being recorded into many receivers or receiver arrays. As many as 480 receiver arrays are actively recording data from a single source. Receiver arrays are generally spaced at even increments along the seismic line of traverse. The distance between the source and any given receiver array is normally referred to as source-to-receiver offset or simply offset. To achieve CMP geometry, the active receiver arrays are incremented as the location of the source moves along the seismic line of traverse The location of the source is normally incremented at an even receiver array spacing so that the active receiver arrays may be simply "rolled along" at even increments as source locations change, keeping constant offset geometries with the source. The active receiver arrays may be located entirely on one side of the source (end-on), half on each side of the source (split-spread), or somewhere in between (asymmetric split-spread). The CDP fold coverage or number of CMP traces at a given mid-point is controlled by the number of active receiver groups and the source increment along the line.

Before CMP seismic reflection traces are summed (or stacked) together to form a single stacked trace at each mid-point location along the seismic line, various geophysical processing steps would normally be applied to the data. These might include gain, spherical divergence correction, deconvolution, static corrections, normal moveout (NMO) removal, and trace muting. Since traditional CMP stacking is done to enhance reflection signals, the NMO correction applied is hyperbolic in source-to-receiver offset. In areas of considerable structural dip in the subsurface, a dip dependent hyperbolic NMO might be used. The amount of hyperbolic moveout is determined by the NMO or stacking velocity. Stacking velocity is a function of root-mean-square (rms) velocity and structural dip. In the presence of dip, the stacking velocities are modified by the cosine of the angle of dip. Dip dependent NMO makes this cosine correction and partially migrates reflection energy to true common-reflection points for stacking. Just prior to CMP stacking, data at far offsets and shallow two-way travel times are generally muted or zeroed. This is done to reduce the effects of NMO stretch and to suppress contamination from unwanted refraction arrivals.

A stacked seismic record section is a collection of stacked CMP seismic traces displayed side-by-side in monotonically increasing CMP location. Subsurface structural interpretations can be made from these stacked sections. However, the stacked data is generally migrated to produce better seismic images before structural interpretation. Stacked sections can be generated in several forms. A first method is to generate multiple stacked seismic record sections, each with a different effective stacking velocity. These are called constant velocity (CV) stacked sections or panels. These CV stacked panels can be used to make a velocity interpretation which is needed to form a composite or single final stacked section. The interpreter simply selects certain reflection signals from the multiple CV stacked panels. He then applies the corresponding NMO velocities in a time and space varying manner, with interpolation between panels, to produce a composite stacked section of all desirable reflection signals. The final CMP stacked section will thus use variable velocity functions in both two-way travel time and CMP location. This composite stack can then be used for structural interpretation or passed on to a migration step prior to interpretation.

As previously mentioned, refraction signals are generally muted out in the traditional CMP stacking method. Refraction signals are considered undesirable coherent noise and many efforts are made to suppress this form of energy in the CMP stacking process. In many geographical areas of the world, these refracted signals and other related source generated coherent noise completely mask any reflected signals. These areas are considered no record (NR) data areas and as such offer very little subsurface structural information. However, refraction signals can offer some subsurface structural information. Prior to the introduction of the CMP reflection stacking method, seismic refraction methods were widely used to map subsurface structure. Indeed, many of the large oil reserves found in the first half of this century were found using refraction methods. Today, the use of refraction signals is confined mainly to computing near surface static corrections.

Reflection events will be generated at all acoustic interfaces in the subsurface. However, refraction events will only be generated in high velocity layers which underlie lower velocity layers, and then only if certain other conditions are right. Reflection events will occur on both the nearest offset seismic traces and the farthest offset seismic traces, whereas refraction events will only occur on seismic traces which are recorded beyond the critical offset distance for a given refraction interface. To record refraction events from deeper and deeper acoustic interfaces, one must record longer and longer source-to-receiver offset traces. A general "rule of thumb" is that one needs offsets which are about three times the vertical depths of interest in the subsurface. Typical maximum offsets used today in reflection CMP recording are on the order of 3000 meters. Thus, refraction events might be expected to be present on these data down to depths of about 1000 meters.

For planer refraction interfaces, refraction events will have linear moveout with increasing offset. This linear moveout will be a function of structural dip and the refractor velocity. In a shot profile gather of seismic traces, the linear moveout for a given planer refractor will be different in the up-dip direction from the down-dip direction (split spread recording). However, in a CMP gathering of seismic traces, there is no difference between up-dip and down-dip moveouts because of source/receiver reciprocity. In a CMP trace gather, the linear moveout velocity of a refraction event from a single planer cosine of the angle of dip in the refractor.

Prior work with seismic refraction data has not included CMP stacking of the refraction data U.S Pat. No. 3,629,798 (D. W. Rockwell, 1971) worked with refraction data but only stacked data from a single shot. No data was gathered over a CMP for stacking, to provide the advantage of properly imaging refraction wave arrivals.

Adams et al received U.S. Pat. No. 4,232,378 in 1980, which relates to a refraction seismic technique, which studies the amplitude of long and short shot-to-receiver-distance refracted waves. There is no discussion of stacking the refracted waves.

Also, Ruehle teaches a technique for acquiring refraction data in U.S. Pat. No. 4,242,740, but does not disclose a method of stacking the data.

Gassaway et al. received related U.S. Pat. Nos. 4,373,197; 4,393,488; and 4,528,649 which were assigned to applicant's assignee. A 'roll-along' technique of shifting source and detector arrays is disclosed, whereby the resulting refracted data can be systematically indexed to offset position. Overlapping stackable displays are produced which are indexed to a common inline position and to refraction travel direction. However, no CMP stacking technique is disclosed, and the method instead relates to distinguish shear wave data from compressional wave data.

Monastyrev, V. K. et al received Union of Soviet Socialist Republics Patent No. 864215 in 1981. Multiple profiles of refracted waves are recorded, to also record elastic oscillations at known distances from seismic excitation points, which are nearly the same as the distances to the initial points where refracted waves exit at the surface. The method provides for multiple tracking of common depth refracting areas. Refracted waves corresponding to this total depth area are selected and tau-P summed using various cutoff velocities, which are determined according to the maximum energy values and signal-to-noise ratio. There is no discussion of the need to properly mute the arriving waves which originate at a point inside the critical offset distance. Nor is there a discussion of the use of several constant velocities to generate multiple panels of summed data. Also, Monastyrev et al do not discuss using a generated near-surface velocity model to create a solution to near-surface statics.

A Russian brochure, whose title has been translated as "Method For Studying Refracting Boundaries In Geologic Layers" is dated Sept. 5, 1988. It is believed that the brochure was published by the Western Siberia Geophysics Institute which is part of the U.S S.R. Ministry of Geology. The brochure may be further identified as RD 03345, and print order 1024. It relates to a common depth area seismic refraction method, which is based on multiple summation of useful information in the refracted waves. The method itself is not disclosed, and only the benefits of the method are described. Disclosed advantages include simultaneous investigation of several geologic boundaries, being able to study geologic refracting boundaries, and being able to detect heterogeneities in the near-surface section field data.

Hinkley (U.S. Pat. No. 4,577,298) discloses a method estimating and correcting source and receiver statics contained in seismic traces. Refraction ray paths are merely normalized to the paths taken by the reflection components to correct for angular displacements between the refractions and reflection signal components.

Yang, H. published an article entitled "Stacking and Migration Technique For Seismic Refraction" in December 1986. However, neither CMP nor CDP stacking were discussed. Instead, Yang only utilizes a method of common receiver or common source point stacking.

The above methods are all limited in the attempts to image seismic data in that no attempt has been made to incorporate CDP or CMP stacking of the refraction data as taught in the subject application. To date, refraction arrivals are primarily used to generate near surface velocity models for statics computations. Once 'first break' picks on refraction events are made, the seismic data is discarded. No attempt has yet been made to produce an image of the refractors themselves.

Current methods of utilizing only reflection data frequently fall short of providing adequate seismic images of the geology below the earth's surface. There is therefore a need for an improved seismic method to obtain better quality seismic data.

SUMMARY OF THE INVENTION

The present invention has been surprisingly successful in improving the seismic resolution of geologic structures. Acoustic wave receivers are positioned so that they are at an offset distance from an acoustic wave source sufficient to receive refracted waves which have originated from a subsurface refractor of interest and which emerge from the refractor at a critical angle.

Acoustic waves are generated into the subsurface from a plurality of wave sources, to encounter the refractor of interest The acoustic wave arrival representations are recorded at the receiver locations. The refracted wave arrivals are then gathered into CMP trace gathers. The representations which originated at a point inside the estimated critical offset distance are muted, and one tau-P sum of the refraction arrival data which originated beyond the critical offset distance is performed and the data are projected into zero source-to-receiver offset. The summed data is then displayed as a constant velocity stacked trace.

A further variation of the invention relates to a method where, in addition, a plurality of acoustic wave source and acoustic wave receiver locations are used to generate tau-P sums for a plurality of midpoints. A plurality of constant velocities are then used to generate multiple panels of tau-P sums. Portions of several of these multiple panels are then combined to generate a complete image of the subsurface refractors. A near-surface velocity model can then be designed from multiple panels of tau-P sums. A solution to near-surface statics in seismic traces can be determined from the near surface velocity model.

The above and other objects, advantages, and features of the method of the invention will become more readily apparent from the following detailed description of the invention, which is provided in connection with the accompanying drawings

DESCRIPTION OF THE DRAWINGS

FIG. 1 is a graph that illustrates the concept that reflection data are summed along hyperbolas and refraction data are summed along straight lines.

FIG. 2 is a side view, that illustrates how a plurality of panels of tau-P sums are combined to generate a complete image of the subsurface refractors.

FIG. 3 is a sectional view of the earth illustrating the reflection geometry from a CMP gather of seismic traces.

FIG. 3(a) is a sectional view of the earth illustrating the refraction geometry for a CMP gather of seismic traces.

FIG. 4 is a graph that illustrates the corresponding travel times for reflection and refraction event arrivals.

FIG. 5 is a sectional view of the earth illustrating the reflection geometry for a CMP gather where a dip of $\theta$ is introduced into the layer boundary.

FIG. 5(a) is a sectional view of the earth illustrating the refraction geometry for a CMP gather where a dip of $\theta$ is introduced into the layer boundary.

FIG. 6 is a graph overlay of FIG. 2 that illustrates the corresponding travel times for reflection and refraction arrivals for the layer with a dip of $\theta$.

FIG. 7 is a conventional CMP reflection stack for seismic line 102.

FIG. 8 is a corresponding tau-P stack for seismic line 102.

FIG. 9 shows two shot profiles for seismic line 2000.

FIG. 10 is the resulting conventional CMP reflection stack for seismic line 2000.

FIG. 11 shows several CMP gathered trace profiles for seismic line 2000.

FIG. 12 shows a constant velocity, tau-P stack for seismic line 2000.

DETAILED DESCRIPTION OF THE INVENTION

In accordance with the present invention, a new improved method and means for using seismic refraction data to improve the seismic resolution of geologic structures has been developed.

With some modification, the CMP stacking method can be used to enhance refraction signals. FIG. 1 displays a CMP gather of seismic traces on which both reflection events 1 and refraction events 2 are shown. In conventional reflection stacking or summing, hyberbolic moveout is assumed. However, to stack refraction events, linear moveout must be assumed prior to summing. In addition, long offset seismic traces will not be muted as in reflection data. Instead, traces which lie inside estimated critical refraction distances (critical offset distances) will be muted. The linear moveout applied to the data is directly related to the refractor velocities of interest. As in reflection CMP stacking, one can generate a set of constant moveout or velocity stacked panels for an entire seismic line of traverse. These constant refraction velocity panels can be incremented in either even increments of velocity or the reciprocal of velocity commonly called slowness.

Another commonly used term indicating summing along even increments of slowness is called "tau-P" summing. We will here use the term "tau-P sum" to indicate a single sum of CMP seismic traces which have had linear moveout applied. A "tau-P stack" will be defined as a collection of tau-P sums at a single constant refraction velocity for many CMP's along a seismic line of traverse. A constant refraction velocity panel is thus a tau-P stack at a single constant linear moveout. The linear moveout correction is zero at zero source-to-receiver offset and increases linearly with increasing offset. This makes refraction event arrival times on constant velocity tau-P stack panels equivalent to intercept times commonly used in refraction methods. For simple layered models, intercept times are easily related to refractor subsurface depths. Thus, structural interpretation can be done on tau-P stacks.

Since refraction velocity can have strong discontinuities in the subsurface, a composite refraction stacked section should be generated using a "cut and splice" method rather than an interpolation across a number of constant velocity tau-P stacks. This cut and splice method is illustrated in FIG. 2. Shown on the top of the figure are three constant velocity tau-P stack panels. Each of these stacks contains a refraction event of interest 3, each slightly deeper in time than the other. A composite tau-P "spliced" section 4 is shown in the bottom of FIG. 2. It contains all three refraction events stacked at appropriate linear moveout velocities. Using this method there will be no moveout stretch introduced in either the tau-P stacks or the composite refraction stack.

FIGS. 3 and 3a show the reflection and refraction geometry respectively for a CMP gather of seismic traces over a simple two layer velocity (V) model which has V2>V1 such that refraction will take place in layer number 2. FIG. 4 shows the corresponding travel time curves for the event arrivals. The reflection event has hyperbolic moveout at a velocity of V1, while the refraction event has linear moveout at a velocity of V2 beginning at an offset defined by the critical offset distance. Both reflection and refraction events are tangent and overlay one another at the critical offset distance. The reflection event will persist beyond the critical offset distance as a wide angle reflection. Beyond the critical offset distance this wide angle reflection will undergo phase changes in the event waveform. The zero offset two-way reflection time is indicated by T0, while the projected refractor intercept time is indicated by Ti. The conversion to depth (Z) from each of these zero offset times is shown below:

$$Z = (T0/2) * V1 \text{ reflection equation} \quad (1)$$

$$Z = (Ti/2)*(V2*V1)/SQRT(V2*V2 - V1*V1) \\ \text{refraction equation} \quad (2)$$

FIGS. 5 and 5a show the reflection and refraction geometry respectively for a CMP gather of seismic traces over the same two layer model as in FIG. 3, except a dip of $\theta$ 5 is introduced into the layer boundary 6. Note that if the dip of the layer boundary exceeds the compliment of the critical refraction angle, refraction arrivals will not exist. Here the depth to the reflector/refractor (Z) is defined as the perpendicular distance to the layer boundary below the CMP location. Shown in FIG. 6 on an overlay of FIG. 4 are the corresponding travel times for this dipping layer. The zero offset two-way reflection time (T0) will remain unchanged from FIG. 4 since the depth, Z, is defined along the perpendicular path to the bed. However, the offset travel time curve for the reflection has changed. It is still hyperbolic in offset, but with a velocity modified by the cosine of the angle of dip in the layer boundary. The refraction arrival times behave similarly. First, the intercept time, Ti, remains unchanged from FIG. 4. However, the linear moveout velocity from the critical distance outward has again been modified by the cosine of the angle of dip. An interesting result of these figures is that one can still use both equations (1) and (2) to compute perpendicular layer depths for both horizontal and dipping layer boundaries. Thus, if the layer velocities do not change along a seismic traverse, equations (1) and (2) can be simplified to:

$$Z = T0 * C1 \text{ reflection equation} \quad (3)$$

$$Z = Ti * C2 \text{ refraction equation} \quad (4)$$

where C1 and C2 are simply constants defined by the two velocities, V1 and V2. Since Z is the same in both equations (3) and (4) this implies that the stacked T0 reflection times are simply a scaled version of the stacked Ti intercept refraction times. Thus the images seen on a CMP reflection stacked section will appear as a scaled version of the images seen on a CMP refraction stacked section.

The above discussion applies only to planer dipping two layer models. For a case of a two layer model where dip is nearly planer over a spread length, equation (4) would be a good first order approximation and similar conclusions could be drawn. In a two layer model with severe structuring within a spread length, smoothing would result in the intercept times causing smoothing in depth estimates. With multiple dipping layers, neither equations (3) nor (4) are correct However, the time structures would be similar between the two CMP stacked sections.

In present day seismic exploration for oil and gas reserves, refraction arrivals are primarily used in the generation of near surface velocity models for statics computation. Common methods use first break picks on refraction events as an input to linear and non-linear model building programs. The picks are made either by hand, machine, or both interactively. Once the picks are made, the actual wiggle trace seismic data is discarded and a velocity model is generated which minimizes the difference between raw pick times and theoretical times. There is no error minimization done on the actual wiggle trace seismic data, just the pick times themselves. Without good first breaks on the raw single fold seismic data traces, this type of method tends to give poor results.

The primary goal in refraction statics is merely to build a near surface velocity model. The present invention, however produces an image of the refractors themselves. Conventional CMP reflection stacking is generally useless in imaging the very near surface because recording parameters are mainly designed to image much deeper structures. On the other hand, the CMP refraction stacking method disclosed herein is quite suitable for imaging near surface refractors using conventionally recorded CMP reflection data. Once time images of the refractors of interest are made, depth computations can be made from the intercept times displayed on the stacked sections. Since picking of the intercept times is done after considerable CMP summing, signal-to-noise ratios are improved which could enable a much more stable solution.

FIG. 7 is a conventional CMP reflection stack for seismic line 102. On FIG. 7, one sees a set of shallow reflections indicating a depression 7 at about 0.4 seconds. Shown in FIG. 8 is the corresponding tau-P stack at a constant velocity of 4200 meters per second. Here a refraction event 8 is seen at about 0.3 seconds intercept time. The structural configuration of this refraction event is very similar to those reflection events on the conventional stack. The reflection boundary and the refraction boundary are therefor likely to be the same event. In this example, both reflection and refraction stacking produce similar images, even though they are derived from independent data on CMP gathered seismic traces; i.e., the reflection data comes from near offsets while the refraction data comes from far offset data. In this example, the refraction image shown in FIG. 8 can be used to generate a near surface refraction statics model.

In many areas of the world, the CMP reflection method has been unable to produce images of reflectors in the subsurface. The primary cause of this has been source generated noise which propagates outward from the energy source. Many times this noise has a relatively low propagation velocity, masking only the nearer offset seismic traces. Since refractions are primarily on far offset traces, they may exhibit much less noise contamination and be quite suitable for stacking. This has been the case in several exploration areas. Since conventionally recorded CMP data has limited offsets, only the very shallow refractors can be imaged with the inventive CMP refraction method (<1000 meters). However, by recording longer offsets, deeper refractions can be imaged.

FIGS. 9 through 12 each display different forms of seismic data for seismic line number 2000, which is located at an offshore area of poor reflection data quality. FIG. 9 shows two shot profiles for seismic line 2000. The maximum source-to-receiver offset used was about 3800 meters, slightly longer than normal. FIG. 10 is the resulting conventional CMP reflection stack. Very poor data quality is indicated on this reflection stack. FIG. 11 illustrates several CMP gathered trace profiles. In both FIGS. 9 and 11 one can see refraction arrivals 9 on the far offset traces. A constant velocity tau-P stack at a velocity of 3043 meters per second is shown in FIG. 12. A set of refraction events 10 is easily seen at about 0.6 seconds rising to about 0.3 seconds on the left of the section. An anticlinal feature 11 is indicated in the center of the section at about 0.6 seconds. None of the events are seen on the conventional stack (FIG. 10). In this example, structural interpretation is clearly improved by the inventive tau-P refraction stacking method.

The above described preferred embodiment for stacking seismic refraction data may be further described in the following manner:

1. Acoustic wave receivers are positioned so that they are at an offset distance from an acoustic wave source sufficient to receive refracted waves which have originated from a subsurface refractor of interest and which emerge from the refractor at a critical angle.
2. Acoustic waves are generated into the subsurface from a plurality of wave sources, to encounter the refractor of interest. The acoustic wave arrival representations are recorded at the receiver locations.
3. The refracted wave arrivals are then gathered into common midpoint trace gathers.
4. The representations which originated at a point inside the estimated critical offset distance are muted, and one tau-P sum of the refraction arrival data which originated beyond the critical offset distance is performed and are projected into zero source-to-receiver offset is performed.
5. The summed data is then displayed as constant velocity stacks.
6. Another embodiment of the invention relates to a method where, in addition, a plurality of acoustic wave source and acoustic wave receiver locations are used to generate tau-P sums for a plurality of midpoints.
7. A plurality of constant velocities are then used to generate multiple panels of tau-P sums.
8. Portions of several of these multiple panels are then combined to generate a complete image of the subsurface refractors.
9. A near-surface velocity model can then be designed from multiple panels of tau-P sums. A solution to near-surface statics in seismic traces can be determined from the near surface velocity model While a preferred embodiment of the invention has been described and illustrated, it should be apparent that many modifications can be made thereto without departing from the spirit or scope of the invention. Accordingly, the invention is not limited by the foregoing description, but is only limited by the scope of the claims appended hereto.

What is claim is:

1. A method of improving the seismic resolution of geologic structures, said method comprising the steps of:
   (a) positioning acoustic wave receivers at locations so that they are at an offset distance from an acoustic wave source sufficient to receive refracted waves which have originated from a subsurface refractor of interest and which emerge from said refractor of interest at a critical angle;
   (b) generating acoustic waves into the subsurface from a plurality of acoustic wave sources so that said acoustic waves encounter said subsurface refractor of interest;
   (c) recording arriving representations of said acoustic waves generated from said sources, at said receiver locations;
   (d) gathering refracted wave arrivals into common midpoint trace gathers;
   (e) muting said arriving representations which originated at a point inside an estimated critical offset distance;
   (f) performing one tau-P sum of said refraction arrival data which originated beyond said critical offset distance and which are projected into zero source-to-receiver offset; and
   (g) displaying said tau-P summed data as constant velocity stacks.

2. The method of claim 1, wherein a plurality of acoustic wave source and acoustic wave receiver locations are used to generate tau-P sums for a plurality of common midpoints.

3. The method of claim 2, wherein a plurality of constant velocities are used, to generate multiple panels of tau-P sums.

4. The method of claim 3, wherein portions of several of said multiple panels are combined to generate a complete image of said subsurface refractors.

5. The method of claim 4, wherein multiple panels of tau-P sums are generated to design a near-surface velocity model.

6. The method of claim 5, wherein said near-surface velocity model is generated to create a solution to near-surface statics in seismic traces.

7. In a method of improving the seismic resolution of geologic structures, of the type wherein acoustic wave receivers are positioned at locations so that they are at an offset distance from an acoustic wave source sufficient to receive refracted waves which have originated from a subsurface refractor of interest and which emerge from said refractor of interest at a critical angle, and wherein said acoustic waves are generated into the subsurface from a plurality of acoustic wave sources so that said acoustic waves encounter said subsurface refractor of interest, and wherein arriving representations of said acoustic waves generated from said sources are recorded at said receiver locations, the improvement characterized by:

(a) gathering refracted wave arrivals into common midpoint trace gathers;

(b) muting the arriving representations which originated at a point inside an estimated critical offset distance;

(c) performing one tau-P sum of said refraction arrival data which originated beyond said critical offset distance and are projected into zero source-to-receiver offset; and (d) displaying tau-P the summed data as constant velocity stacks.

8. The method of claim 7, wherein a plurality of acoustic wave source and acoustic wave receiver locations are used to generate tau-P sums for a plurality of common midpoints.

9. The method of claim 8, wherein a plurality of constant velocities are used, to generate multiple panels of tau-P sums.

10. The method of claim 9, wherein portions of several of said multiple panels are combined to generate a complete image of said subsurface refractors.

11. The method of claim 10, wherein multiple panels of tau-P sums are generated to design a near-surface velocity model.

12. The method of claim 11, wherein said near-surface velocity model is generated to create a solution to near-surface statics in seismic traces.

* * * * *

UNITED STATES PATENT AND TRADEMARK OFFICE
CERTIFICATE OF CORRECTION

PATENT NO. : 5,083,297
DATED : January 21, 1992
INVENTOR(S) : William J. Ostrander It is certified that error appears in the above-identified patent and that said Letters Patent is hereby corrected as shown below:

Claim 7, Col. 12, line 1: "displaying tau-P the" should read --displaying the--

Signed and Sealed this

Twelfth Day of April, 1994

Attest:

BRUCE LEHMAN

*Attesting Officer*

*Commissioner of Patents and Trademarks*